United States Patent
Lee et al.

[11] 3,897,753
[45] Aug. 5, 1975

[54] MEANS AND METHOD FOR SELECTIVELY CONTROLLING ANIMALS

[76] Inventors: Barry Thomas Lee, 22715 Clarendon St., Canoga Park, Calif. 91364; Gilbert Peter Hyatt, 11101 Amigo Ave., North Ridge, Calif. 91324

[22] Filed: Jan. 31, 1974

[21] Appl. No.: 438,328

[52] U.S. Cl. .............................. 119/51 R; 119/29
[51] Int. Cl. ............................................ A01k 5/02
[58] Field of Search ........................... 119/51 R, 29

[56] References Cited
UNITED STATES PATENTS

| | | | |
|---|---|---|---|
| 3,180,321 | 4/1965 | Aldinger | 119/51 R |
| 3,465,724 | 9/1969 | Broadbent | 119/51 R |
| 3,516,575 | 6/1970 | Moffitt | 119/51 R X |
| 3,541,995 | 11/1970 | Fathauer | 119/51 R |
| 3,557,757 | 1/1971 | Brooks | 119/51 R |
| 3,557,758 | 1/1971 | Lack | 119/51 R |
| 3,753,421 | 8/1973 | Peck | 119/29 |

*Primary Examiner*—Hugh R. Chamblee

[57] ABSTRACT

An arrangement is provided for controlling animals on a selective basis such as for feeding, watering, and for providing access to controlled areas. A sensor arrangement selectively identifies particular animals, a signal processor processes sensed signals to generate output signals, and an output arrangement provides the control for such animals.

In a preferred embodiment, a cat feeding arrangement is provided to permit a pet cat to eat from a controlled food dispenser and to preclude other cats from feeding from such dispenser. In such an arrangement, a cat may wear a collar having a conductor embedded therein for changing an electric field provided by an excitation arrangement. Monitoring of field characteristics with a sensor provides an indication whether the cat is wearing the proper identification collar and should therefore be permitting to feed or whether the cat is not wearing the proper identification collar and should therefore be precluded from feeding. An output device such as an electrical shock device is used to discourage a cat that is not wearing a proper identification collar from feeding.

Other sensor arrangements are provided to identify selected animals and other output devices are provided to perform various other output operations. For example, an output actuator may be used to mechanically dispense food, unlatch a door, or provide other desired operations on a selective basis.

25 Claims, 9 Drawing Figures

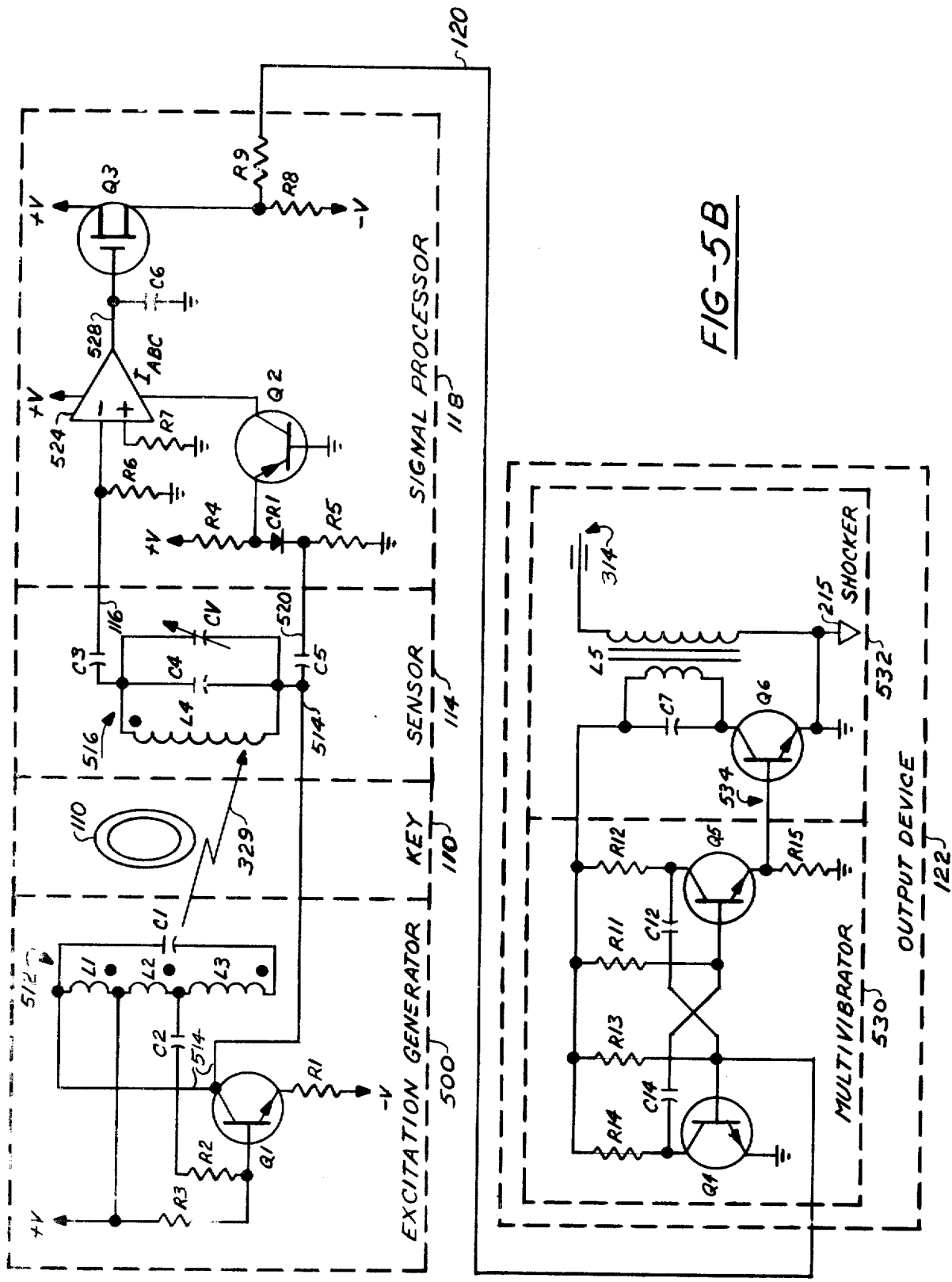

3,897,753

MEANS AND METHOD FOR SELECTIVELY CONTROLLING ANIMALS

TABLE OF CONTENTS

| SECTION | PAGE |
|---|---|
| ABSTRACT | 1 |
| BACKGROUND OF THE INVENTION | 2 |
|   1. Field of the Invention | 2 |
|   2. Description of the Prior Art | 2 |
| SUMMARY OF THE INVENTION | 3 |
| BRIEF DESCRIPTION OF THE DRAWINGS | 5 |
| DETAILED DESCRIPTION | 6 |
|   Mechanical Configuration | 10 |
|   Electronic Subsystem | 16 |
|   Collar | 23 |
|   Multi-Element Key | 26 |
|   Alternate Embodiments | 29 |
|   Scope | 34 |
|   Considerations | 36 |
| CLAIMS | 38 |

BACKGROUND OF THE INVENTION

1. Field of the Invention

This invention relates to access control in general and particularly to access control for animals on a selective basis.

2. Description of the Prior Art

The prior art shows control of animals being performed with mechanical arrangements such as fences, gates, corrals, pens, and the like. Electrical means for control of animals has been provided with electrified fences. The prior art does not show automatic control of animals on a selective bases nor an arrangement for selectively responding to animals for providing a desired operation such as feeding or providing access for a selected animal.

Animal feeding and watering devices are available that are responsive to animal actions such as mechanical arrangements for dispensing food and water when an animal depresses a valve mechanism such as with a water fountain. These prior art arrangements do not use automatic control nor selective control, where the animal provides the actuator control and where the valve will operate for any animal depressing the valve mechanism.

In the prior art, a cat owner may provide food for a pet, but the food may be consumed by other cats. In another application, a rancher may provide water, grain, or salt for his cattle; which may be consumed by other cattle or wild animals that have access to the range. Multitudes of other examples are well known where food and drink are provided for particular animals but which may be consumed by other animals because of the non-selective nature of the container or dispenser.

SUMMARY OF THE INVENTION

The present invention provides an improved system for controlling access. In particular control of access for animals on a selective basis is provided.

In one embodiment of the present invention, animals that are to be selectively controlled are identified with a collar or other identifying device. Sensing of the identifying device and controlling an output device in response thereto is provided. In a preferred embodiment, only a simple passive device need be carried by the animal, where the complex circuitry that consumes power need not be carried by the animal.

In one embodiment, a collar is provided with a conductor such as a wire embedded therein for changing an electric field associated with a field source and sensor arrangement. Monitoring of the electric field with a sensor provides a sensor signal related to the electric field which is processed with signal processors and used to control an output device. Other sensor arrangements may use color detectors, illumination detectors, sound detectors, weight detectors, and other detectors that are responsive to the characteristics of an animal or a device contained therewith. In one embodiment, output devices may be repelling devices such as shockers, noise makers, light flashers, and other such arrangements that may repel an animal. In another embodiment, output devices may be actuators for unlocking doors and gates, for opening doors and gates, for dispensing food or drink, and for providing other electromechanical operations. In still another embodiment, output devices may be recording devices to indicate the number of animals sensed, the type of animals sensed, or for recording other sensed characteristics.

An object of the present invention is to provide an animal control arrangement.

A further object of the present invention is to provide an animal sensing arrangement.

A still further object of the present invention is to provide an output arrangement for controlling animals.

Still another object of the present invention is to provide a system for selectively feeding animals.

Yet another object of the present invention is to provide a training device to train animals.

A still further object of the present invention is to provide an access arrangement such as with an electronic lock and key.

Yet another object of the present invention is to provide a passive animal borne identification device that does not require self contained excitation.

Still another object of the present invention is to provide an improved physical design of an animal feeder arrangement.

Yet still another object of the present invention is to provide an improved phase sensitive detector arrangement.

The forgoing and other objects, features, and advantages of this invention will become apparent from the following detailed description of preferred embodiments of this invention, as illustrated in the accompanying drawings.

BRIEF DESCRIPTIONS OF THE DRAWINGS

A better understanding of the invention may be had from a consideration of the detailed description hereinafter taken in conjunction with the drawings described below.

FIGS. 4A and 4B, illustrates alternate embodiments of the key controlled system in accordance with the present invention; wherein FIG. 4A illustrates a key controlled food dispenser and FIG. 4B illustrates a key controlled access door.

FIGS. 5A and 5B, illustrates a preferred embodiment of the present invention; wherein FIG. 5A illustrates a block diagram of the preferred embodiment and FIG. 5B illustrates a detailed schematic representation of the preferred embodiment in accordance with the block diagram of FIG. 5A.

FIGS. 6A and 6B, illustrates alternate embodiments of a key device; wherein FIG. 6A illustrates physical construction of a collar key and FIG 6B illustrates a schematic representation of an even more selective key device in accordance with the present invention.

Figure 1:
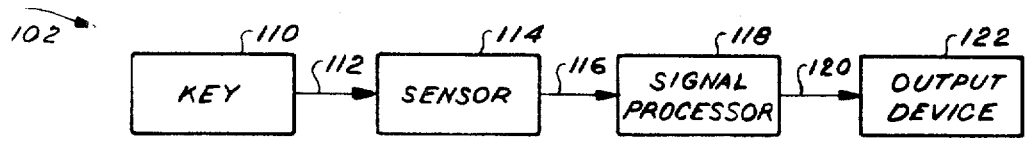
FIG. 1 is a block diagram of a key controlled system in accordance with the present invention.

By way of introduction of the illustrated embodiment, the components shown in FIGS. 1 through 6 of the drawings have been assigned general reference numerals and a brief description of such components is given in the following description. The components in each figure have in general been assigned three digit reference numerals wherein the hundreds digit of the reference numerals corresponds to the figure number. For example, the components in FIG. 1 have reference numerals inbetween 100 and 199 and the components in FIG. 2 have reference numerals inbetween 200 and 299 except that the same component appearing in successive drawing figures has maintained the first reference numeral.

DETAILED DESCRIPTION

The system of the present invention is generally applicable to control of animals and is further applicable to control of people, vehicles, and for other applications. Some of these applications will be discussed hereinafter. Other applications will become apparent to those skilled in the art from the teachings of the present invention.

A preferred embodiment will now be described to exemplify the broader concepts of the present invention. A family having a pet and going on vacation has several alternatives. The pet may be taken with the family on the vacation, the pet may be left in the care of other people such as in a kennel, or the pet may be left at the home of the family. If the pet is left at the home, consideration must be given to providing consumables such as food and drink for the pet. If food and drink is to be left for the pet, there is concern that other animals such as stray cats and stray dogs might consume the food and drink. An arrangement will now be discussed to selectively permit the pet to obtain the food or drink and to exclude undesired animals from consuming the food and drink.

A pet feeder embodiment of the present invention having an animal control system 102 will now be described with reference to FIG. 1. A key or identifying device 110 is provided to identify an animal. The key may be a physical device such as a collar having a conductor embedded therein, a flag having a particular color, or an active transmitter for transmitting electromagnetic energy. In an alternate embodiment, the key may be a characteristic of the animal such as weight, size, color, or other such characteristics. A signal 112 from the key 110 may be electrically, mechanically, optically, or otherwise coupled to sensor 114. Sensor 114 may be an electronic sensor for sensing electrical signals such as signals inducted or transmitted, an illumination detector for sensing color or other illumination characterics, or may be well known sensor devices. Sensor 114 generates sensor signal 116 to signal processor 118 to provide the desired processing to generate output signal 120 to output device 122. Output device 122 may be an electric shock mechanism, an electro-mechanical actuator, a noise-making device such as a bell or ultrasonic transducer, or may be well known controllable output devices. Output devices may include an actuating member such as for a door or latch to exercise control over an animal.

Figure 2:
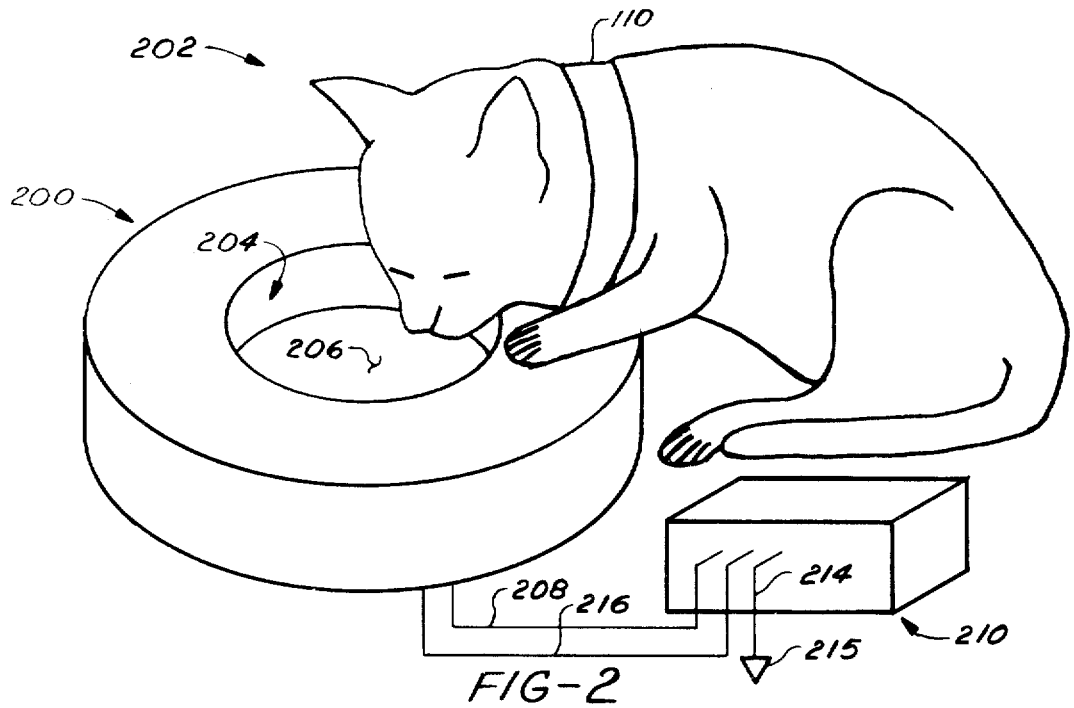
FIG. 2 illustrates the use of a cat feeder arrangement in accordance with the present invention.
Figure 3:
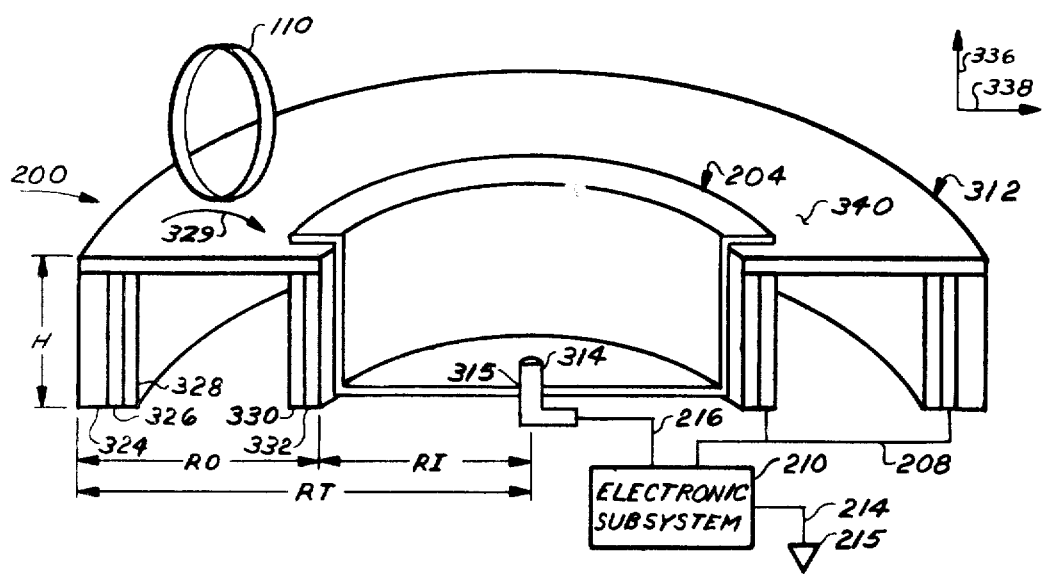
FIG. 3 illustrates a cross-sectioned view of the feeder arrangement shown in FIG. 2.

A first embodiment is shown in FIGS. 2 and 3 where a cat 202 approaches food bowl 204 mounted in feeder 200 and containing food 206. If the cat 202 is wearing a special identifying collar 110, an electrical field in the region of bowl 204 is distorted. Sensor 114 detects the perturbed electrical field and disables output device 112 ro permit the selected cat wearing the proper collar to eat from bowl 204. If a cat not wearing a proper collar approaches bowl 204, the control system 102 will not disable output device 122; where output device 122 provides a high voltage potential difference between bowl 204 and earth-ground 215. When a cat is in contact with ground 215 and also touches the bowl 204 or food 206, the cat completes the electrical circuit between ground 215 and an electrode 314 exciting bowl 204 or food 206, which results in the cat receiving a shock. In alternate embodiments, an animal may receive a disturbing noise or other such repulsive response to drive the animal away from food 206. Therefore, it can be seen that the arrangement discussed with reference to FIGS. 2 and 3 will selectively permit a particular animal or combination of animals to eat food 206 and will selectively preclude other animals from eating food 206. An electronic subsystem 210 is provided to process electric signals to detect and control animals. In one embodiment described in detail with reference to FIG. 5B hereinafter, electronic subsystem 210 is connected to an excitation coil and a sense coil with conductor 208, to an electrode with conductor 216 and to ground 215 with conductor 214.

Figure 4A:
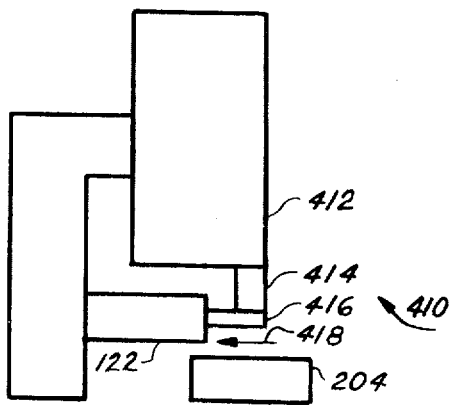

A second embodiment is shown in FIG. 4A, where food dispenser 410 is controlled to dispense food to bowl 204. Hopper 412 is provided for containing food which is dispensible through port 414 under control of solenoid actuated blade 416. When an animal having an appropriate key comes into proximity of food dispenser 410, solenoid 122 is actuated as shown by arrow 418 to open port 414; thereby dispensing food into bowl 204 from hopper 412. Control system 102 controls solenoid 122 to provide a short actuating operation 418 once for each detection of an animal to dispense a metered amount of food each time an animal having an appropriate key approaches food dispenser 410.

Figure 4B:
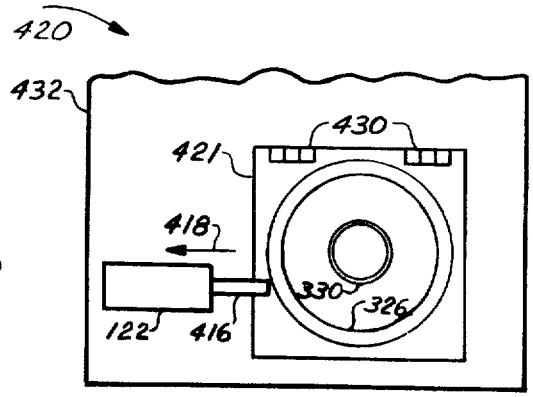

A third embodiment 420 is shown in FIG. 4B, where a latch is controlled to unlock a door 421. System 102 controls solenoid 122 to slide bolt 416 in the direction of arrow 418 to lock or unlock door 421 to provide selective access. Control device 420 may include a pet door 421 placed in a door of a residence 432 or may be a pen, kennel, or other such doorway. Special pet doors are commercially available to permit pets to access areas such as a residence or garage. For example, small pet doors such as door 421 are well known which may be inserted in doors to residences 432 with hinges 430 to permit a pet to enter or leave the residence. A pet door 421 may have a locking device to prevent the pet from using the door. In such prior art arrangements, when the pet door 421 is unlocked, other animals may enter or leave through the pet door 421 and other access may be permitted such as for burglars or vandals. The system of the present invention may be used for selectively locking or unlocking a door under control of an identifier or key, as discussed herein for other embodiments of the present invention. Excitation coil 326 and sense coil 330 may be mounted on pet door 421 to detect a pet key device. Electronic subsystem 210 (FIGS. 2 and 3) generates output signal 120 (FIG. 1) to output device 122, which is a solenoid in the embodiment shown in FIG. 4B, to unlatch pet door 421.

Mechanical Configuration

A preferred embodiment of a pet feeder arrangement is shown in FIG. 3. A bowl 204 is suspended within supporting structure 312 to properly position the bowl within the sensor arrangement. The bowl 204 has an electrode 314 for electrically exciting food contained in bowl 204 with an excitation signal on signal line 216.

Support structure 312 is shown having cylindrical symmetry and is further shown in cross-sectional form, being cross-sectioned in the plane of the drawing. Cylindrical stand 324 is provided to hold the feeder assembly 200 above the ground. An excitation coil 326 may be wound on a coil form 328 and may be mounted near the outer periphery of feeder assembly 200. Excitation coil 326 generates an electric field 329 for exciting a sense coil 330. Sense coil 330 may be wound on a coil form 332 and mounted at an inner periphery within the excitation coil 326.

As discussed in detail hereinafter for the operation of the electronic subsystem 210, electric field energy 329 is coupled from excitation coil 326 to sense coil 330, where a disturbance in the electric field 329 such as caused with a "shorted turn" pet collar 110 will be detected and processed by electronic subsystem 210. As discussed in more detail hereinafter, a shorted turn may be an equivalent shorted transformer secondary winding which may be contained in a collar or other key device to disturb the electric field 329 generated by excitation coil 326, where such disturbance is detected with sense coil 330 and associated signal processing circuitry in electronic subsystem 210.

Particular advantages are achieved with the configuration shown in FIG. 3. For example, increased sensitivity is obtained by providing a plurality of coils 326 and 330 having symmetry such as circular symmetry and being concentric therebetween. Further, it has been shown that a sense coil 330 contained within or internal to an excitation coil 326 increases sensitivity. It is herein intended to mean that a first coil is within or is internal to a second coil if the first coil is within the field pattern inside of the second coil, independent of relative displacements of these coils therebetween such as in the axial direction shown by arrow 336 or the radial direction shown by arrow 338. Although coils 326 and 330 are shown to be precisely concentric in FIG. 3, the teachings of the present invention are equally applicable and intended to cover embodiments wherein coils 326 and 330 are displaced in the axial direction 336, in the radial direction 338, or otherwise positioned or configured to provide coupling of an electric field 329 therebetween.

Further, increased sensitivity and other advantages may be obtained by providing sense coil 330 around the bowl 204, although the teachings of the present invention are equally applicable to alternate embodiments wherein a bowl 204 may be mounted on top of a sense winding, under a sense winding, and otherwise mounted relative to excitation winding 326 and sense winding 330 as will become apparent to those skilled in the art from the teachings of the present invention.

Particular advantages are obtained by exciting the contents of bowl 204 with electrode 314. Electrode 314 is shown penetrating bowl 204 to provide contact with contents of the bowl 204. In one embodiment, a hole 315 may be drilled in bowl 204 to permit electrode 314 to penetrate the bowl through the hole 315. Well known sealing and bonding agents may be used to bond electrode 314 to bowl 204 and to seal the electrode 314 and hole 315 to prevent leakage of the contents of the bowl. Many alternate embodiments of forming an electrode may be used such as (1) applying a conductive coating to the inside of bowl 204 to form an electrode, (2) routing electrode lead 216 over the top of bowl 204 to excite the contents, (3) exciting other portions of the feeder assembly 200 such as the top structure 340 or other structure that may be contacted by an animal in the process of feeding, and (4) other configurations that will now become apparent to those skilled in the art.

The dimensions of feeder assembly 200 may be related to the size and feeding habits of a particular animal. In a preferred embodiment, a feeder assembly for a pet cat has been found to have particular advantage if bowl radius or inner radius RI is approximately 3 inches, feeder assembly radius or total radius RT is approximately 8 inches, and feeder assembly height H is approximately 2 inches. These dimensions correspond to an embodiment that has been shown to have particular advantages, but it will become apparent from the teachings of the present invention that dimensions, form, and shape may be varied to meet the particular requirements of a feeder application.

A bowl 204 will have particular advantages when constructed of plastic or other relatively nonconductive material because such material minimizes distortion of the electric field 329 and enhances operating characteristics such as sensitivity. A shorted turn device 110 has a strong effect on the electric field 329, but conductive objects and structures that do not enclose a relatively large area such as electrode 314 may not appreciably affect the electronic field 329. A shorted turn may be characterized as a conductor for permitting electric current to flow therethrough and having an area containing electric field lines that are completely enclosed by the current flow and wherein a portion of the area enclosed is not part of the conductor.

Support assembly 312 is shown in FIG. 3 with support legs 324 and top 340 with coil assembly 326, 328, 330 and 332 as individual elements attached together. In a preferred embodiment, support 312 may be a molded plastic structure having low electrical conductivity and being batch fabricated by molding as a single device. Support feet 324 and top 340 may be molded as an integral element. Further, coil forms 328 and 332 may also be molded as part of support structure 312 to further enhance manufacturability. Coils 326 and 330 may be wound on batch fabricated integral forms 328 and 332 respectively; then bonded, potted, or otherwise mounted in place such as with bonding, potting, or other well known processes.

The bowl 204 is shown in FIG. 3 as a separate bowl that is physically independent of support structure 312. Although the bowl 204 may be molded or otherwise formed as an integral part of support structure 312, particular advantage is achieved by providing a bowl 204 that is separate or removable from support 312 to permit the bowl 204 to be cleaned of residue food separate from support structure 312. Further a removable electrode lead 216 may provide advantages by permitting bowl 204 to be easily disconnected from the electronic assembly such as for cleaning purposes. Electrode lead disconnection may be provided with well known connector devices, where disconnection may be at electrode 314, electronic subsystem 210, or at other convenient positons.

Support surface 340 provides particular advantages over an embodiment having merely a bowl 204 and associated lip, wherein the width of surface 340 is related to the spacing between coils 326 and 330 and therefore the width of surface 340 defines the more-sensitive region of feeder 200. Further, feeder 200 may be constructed to position the key 110 over this more-sensitive region that is related to surface 340 when an animal is feeding as shown in FIG. 2. Therefore, particular advantage is achieved by providing a feeder 200 having physical proportions related to (1) the size of an animal, (2) the feeding habits of an animal, (3) the form of an animal, (4) and other such considerations related to positioning of key 110 during the feeding.

A shocker arrangement has particular advantages in discouraging animals from consuming food from feeder 200. Additional advantages are provided by exciting the food 206 with a first shocker electrode 314 so that a shock will be received in the mouth area of an animal and will be received in conjunction with eating. This arrangement has particular advantages, wherein a shock in the mount area when feeding will tend to teach an animal that it should not eat from feeder 200. Further, due to the sensitivity of an animal's mouth area, a low level shock may be used thereby providing greater safety. Still further, excitation of the food 206 reduces the possibility of an animal that has a proper key from being improperly shocked due to improper positioning of the collar relative to the sensitive portions of the feeder arrangement when not in the process of feeding. In a preferred embodiment, the most sensitive field area may be above surface 340 where the collar 110 will be properly positioned in this area only when the animal is feeding and where a less sensitive field area is either outside of or inside of surface 340. Therefore, an animal may not be able to reach the food when the collar is outside of the more sensitive surface area and may not be able to contact the food when the collar is inside of the more sensitive surface area thereby minimizing the possibility of improper shocks.

Further advantage is achieved by exciting the ground 215 or other surface upon which feeder 200 is positioned. This arrangement further precludes an inappropriate shock by requiring the animal to be in a normal feeding position to receive a shock which is with the animal's mounth in the bowl 204 and with the animal's hindquarters off of the feeder 200, thereby properly positioning the key 110 in the more sensitive region of the field 329.

In alternate embodiments, other electrode arrangements may also provide advantages. For example, placing feeder 200 on a conductive device such as a conductive mat or on a window screen located under or around feeder 200 may provide advantages when compared to using the ground 215 as an electrode. Further, providing a conductive electrode area on feeder 200 such as on surface 340 may provide advantages in certain applications.

Electronic Subsystem

Figure 5A:
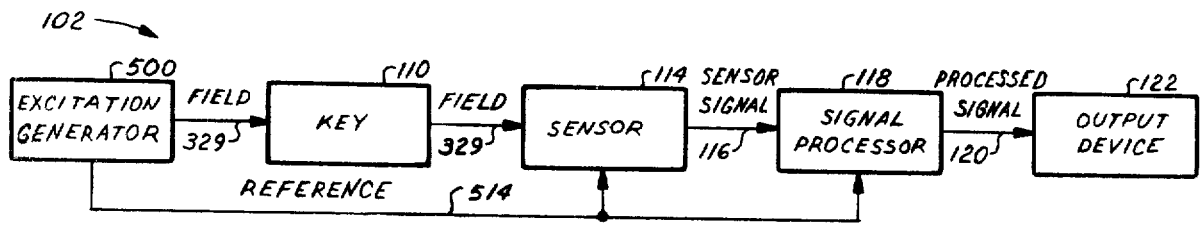

Electronic subsystem 210 is shown in block diagram form in FIG. 5A and in schematic form in FIG. 5B and will now be discussed in detail. Electronic subsystem 210 comprises excitation generator 500 for providing field excitation 329 and sensor 114 for sensing the field 329 and a key device 110. A signal processor 118 provides processed sensor signal 120 in response to the input signal 116 from sensor 114 and reference signal 514. An output device 122 generates an output operation, shown in a preferred embodiment as a shocking signal, in response to processed sensor signal 120 from signal processor 118.

In a preferred embodiment, a key device is a conductive loop or shorted turn and may be contained in a collar of an animal. The key device disturbs an electronic field 329 generated by excitation generator 500, where the disturbed field 329 is detected with sensor 114.

Excitation generator 500 is shown in FIG. 5B as a Hartley oscillator connected in a well known circuit configuration. Hartley oscillators are well known in the art and are described in the textbook by Hurley referenced hereinafter at pages 313-318 therein and in the textbook by Fitchen referenced hereinafter at pages 278-280 therein. Transistor Q1 excites resonance circuit 512 with collector signal 514 and receives positive feedback from oscillator circuit 512 through capacitor C2 and resistor R2 to the base of transistor Q1. This positive feedback arrangement provides stable oscillations, as is well known in the art. Resistors R1 and R3 provide connections between transistor Q1 and excitation voltages $-V$ and $+V$ respectively to set the operating point of transistor Q1, such as is well known for biasing circuits and the like. Resonance circuit 512 includes capacitor C1 and a coil comprising 3 coil elements L1, L2, and L3 having mutually inductance therebetween for generating positive feedback through capacitor C2 and for generating electronic field 329. Resonance circuit 512 receives $+V$ excitation inbetween coils L1 and L2 for dc biasing.

Sensor 114 comprises resonance circuit 516 which senses the electronic field 329 generated by coils L1, L2, and L3 in excitation generator 500. It has been shown that sensor 114 provides increased sensitivity when resonant circuit 516 is tuned to the excitation frequency with capacitor C4. Variable capacitor CV is provided for precision adjustment of the resonant frequency of circuit 516 to provide control over threshold, sensitivity, and other characteristics. Excitation or reference signal 514, defined as an in-phase signal, is summed with an out-of-phase signal induced in coil L4 by field 329. With key device 110 outside of the area that disturbs field 329, resonant circuit 516 is adjusted by a user with capacitor CV so that an out-of-phase signal induced by field 329 cancels or exceeds conducted (in-phase) excitation signal 514, where induced and conducted signals are summed with resonant circuit 516. Therefore, sensor signal 116 is at null or is out-of-phase with excitation signal 514 when the out-of-phase induced signal equals or exceeds the in-phase conducted signal 514 to provide cancellation of the in-phase component of the composite sense signal 116. When key device 110 is brought into proximity of field 329, field 329 is disturbed thereby changing the phase or changing the amplitude or both, changing the phase and amplitude, of the out-of-phase induced signal and thereby introducing an in-phase component on sensor signal 116. Sensor signal 116 is processed with signal processor 118, where signal processor 118 receives sensor signal 116 and reference signal 514 and generates output signal 120 in response thereto. Sensor signal 116 and reference signal 514 are shown having blocking capacitors C3 and C5 respectively to provide dc isolation between circuits, as is well known in the art.

Signal processor 118 is a phase sensitive demodulator (PSD) and may be implemented with well known PSD circuits. Particular advantages have been obtained by using the demodulator circuit 118 shown in FIG. 5B. Demodulator circuit 118 comprises an operational amplifier 524 which is implemented in a preferred embodiment with transconductance amplifier RCA CA3080. Input bias resistors R6 and R7 determine the operating point of amplifier 524. Sensor signal 116 is amplified with circuit 524 to provide output signal 528 when transistor Q2 conducts current into the control input IABC and wherein sensor signal 116 is not amplified nor conducted as output signal 528 when transistor Q2 does not conduct current into control input IABC Conduction of transistor Q2 is controlled by reference signal 520, where diode CR1 will be conductive when forward biased by a negative half-cycle of reference signal 520 and diode CR1 will be non-conductive when reversed biased by a positive half cycle of reference signal 520. Bias resistor R4 and R5 are provided to bias diode CR1 between +V and ground potentials to control the conduction of transistor Q2 during a specific portion of the reference cycle. When diode CR1 is conductive, the emitter of transistor Q2 is low thereby causing transistor Q2 to be non-conductive, and therefore "turning-off" circuit 524. When diode CR1 is non-conductive, the emitter of transistor Q2 is high thereby causing transistor Q2 to be conductive and therefore driving current into the $I_{ABC}$ input of circuit 524 to cause sensor signal 116 to be amplified by circuit 524 and to be provided as amplified sensor signal 528. Therefore, it can be seen that reference signal 520 "chops" or demodulates sensor signal 116 with circuit 524 in-phase with reference signal 514 or 520 to provide a phase related "chopped" signal 528, which is a well known phase sensitive demodulated signal.

Capacitor C6 provides a filtering operation to smooth the chopped output of circuit 524 for control of transistor Q3. Transistor Q3 provides a high impedance output for circuit 524. Output load resistor R8 and coupling resistor R9 provide output signal 120 from transistor Q3. Signal 528 controls field effect transistor (FET) Q3 so that transistor Q3 conducts when demodulated signal 528 has a sufficient amplitude, indicative of key 110 disturbing electric field 329. A key device 110 being in the field 329 will cause output signal 120 to go positive and the absence of a key device 110 in the field 329 will cause the output signal 120 to go negative. Therefore, it can be seen that the state of output signal 120 is indicative of either the detection or the non-detection of key 110.

Output device 122 is shown in FIG. 5B in a preferred embodiment as a shocker device but may be any well known output device. Output device 122 comprises an astable multivibrator 530, also known as a relaxation osciallator, and a shocker circuit 532. Multivibrator 530 comprises transistors Q4 and Q5 having load resistors R14 and R12, bias resistors R13 and R11, and output cross-coupling capacitors C14 and C12, respectively. A first transistor Q5 being conductive will discharge the output cross-coupling capacitor C12 until a second transistor Q4 is turned-on. The second transistor Q4 being turned-on results in the first transistor Q5 being turned-off through the output capacitor C14 of the second transistor Q4 and further results in the output capacitor C12 of the first transistor Q5 being discharged until the first transistor Q5 is again turned-on and the second transistor Q4 is again turned-off. Therefore, the astable nature of the multivibrator circuit 530 causes transistors Q4 and Q5 to alternately conduct for a period of time, where each period of time is related to the time constant of the related output capacitor C14 or C12 respectively and the load resistors R14 and R12 respectively. Operation of an astable multivibrator is well known in the art and is discussed in the textbook by Hurley referenced hereinafter at pages 420–427 therein and in the textbook by Fitchen referenced hereinafter at pages 315–319 therein.

Multivibrator output signal 534 is received from an emitter load resistor R15 in a well known emitter follower circuit configuration to drive amplifier Q6 of shocker circuit 532.

Shock circuit 532 comprises transistor amplifier Q6, flyback transformer L5 and electrode 414. Transistor Q6 amplifies the output of multivibrator 530 to charge up transformer L5 and then to rapidly discharge transformer L5, as is well known in the circuit design art such as for flyback transformers which are widely used in TV receivers and other such equipment. The rapidly collapsing field of transformer L5 induces a high voltage in the secondary winding which is applied between electrode 314 and ground 215. It will be recognized that shock circuit 532 could also be arranged to excite a pair of electrodes or other such arrangement in alternate embodiments of the present invention.

Output signal 120 enables multivibrator 530 and shock circuit 532 when output signal 120 is high, thereby forward biasing the base-emitter junction of transistor Q4 through coupling resistor R9 to enable multivibrator action. When output signal 120 is made negative by detection of key device 110, the base of transistor Q4 is pulled down to a negative voltage thereby reverse biasing the emitter-base junction and forcing transistor Q4 into cutoff. Therefore, transistor Q5 will be forced into saturation and multivibrator action will be disabled. This will prevent the repetitive charging and collapse of the field in transformer L5, thereby disabling the high voltage shock signal. Therefore, it can be seen that relaxation oscillator 530 will successively generate shocking signal pulses to electrode 314 when key 110 is not detected, but where detection of key 110 will disable multivibrator 530 from generating shocking pulses to electrode 314.

When detection of key 110 causes processed signal 120 to be low; transistor Q4 is turned-off, transistor Q5 is turned-on, and transistor Q6 is turned-on thereby drawing current through coil L5. Coil resistance is high enough to limit on current of transistor Q6. In an alternate embodiment that is designed for low power dissipation, input signal 120 may be connected to the base of transistor Q5 thereby turning-off transistors Q5 and Q6 to turn-off current through coil L5 and transistor Q6 when a key 110 is detected.

The time constant of multivibrator 530 may be set for a 10 millisecond on-period and a one second off-period. The 10 millisecond on-period charges transformer L5, then the rapid switch to the off-period causes the field of transformer L5 to collapse thereby generating a high voltage output signal to electrode 314. Because the charging of transformer L5 draws substantial current, a standby period, which is a one-second off-period for the present example, is provided between shock pulses. The one-second off-period is a standby period provided after a shock pulse before again charging transformer L5 for generating another shock pulse.

In a preferred embodiment described with reference to FIGS. 3 and 5, a shock output device 122 is provided that is continuously in operation, providing shock pulses unless disabled by proximity of a key device 110. Various alternate embodiments may be configured that provide either a disabling or an enabling operation in response to proximity of key 110. In one embodiment shown in FIG. 4A, output device 122 may be implemented as a well known solenoid driver and solenoid, wherein processed sensor signal 120 going to the high state would activate the solenoid which in turn would mechanically dispense food or drink or both. In another embodiment shown in FIG. 4B, activation of a solenoid might be used to disengage a latch on a door, gate, or other access devices.

High sensitivity and selectivity may be obtained if the components in excitation generator 500, sensor 114, and signal processor 118 have the values shown in Table I. Because circuit design technology is well known in the art, other circuit configurations and component values will now become obvious to those skilled in the art from the teachings of the present invention.

TABLE I

| | |
|---|---|
| V = 6 volts | C1 = 4,700 picofarads |
| R1 = 68 ohms | C2 = 0.02 microfarads |
| R2 = 150 ohms | C3 = 0.005 microfarads |
| R3 = 100K ohms | C4 = 820 picofarads |
| R4 = 56K ohms | CV = 200–535 picofarads |
| R5 = 10K ohms | C5 = 0.001 microfarads |
| R6 = 10K ohms | C6 = 1,000 picofarads |
| R7 = 10K ohms | L1 = 3 turns of no. 28 wire |
| R8 = 22K ohms | L2 = 3 turns of no. 28 wire |
| CR1 = 1N68 (Raytheon) | L3 = 24 turns of no. 28 wire |
| Q1 = 2N5222 (Motorola) | L4 = 82 turns of no. 28 wire |
| Q2 = 2N5208 (Motorola) | |
| Q3 = 1899E (Amelco) | |

Collar

An important feature of the present invention is the key device, where a preferred embodiment of the key device has been found to be inexpensive to manufacture, passive in nature, and to eliminate the need for self-contained electrical excitation. For example, in a preferred embodiment the key device is merely a conductive loop integrated into a collar for an animal. This conductive loop may be a wire or metal foil embedded in the collar, a conductive collar material such as a graphite impregnated material, or other such arrangements. In another embodiment, the collar may be a woven material having an expandable characteristic like well known expandable woven fabrics and including conductive strands such as copper wires interwoven in the expandable pattern.

Figure 6A:
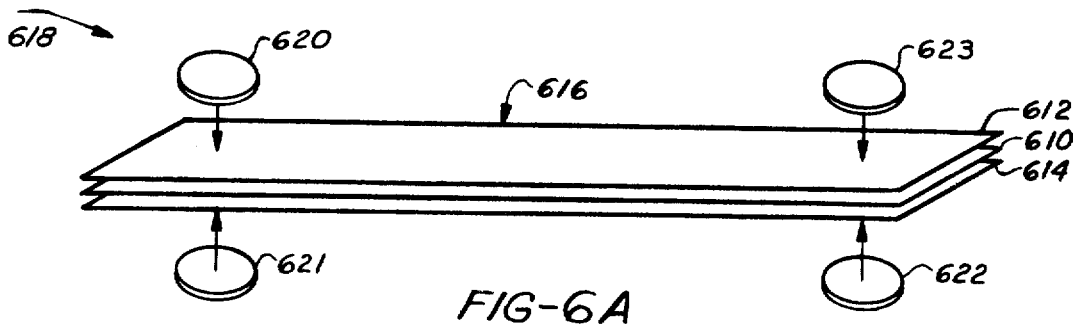

A preferred embodiment of a collar 618 is shown in FIG. 6A, wherein a metal foil 610 such as well known aluminum foil is inserted between layers of fabric in a sandwich arrangement 616 comprising an upper layer 612 and a lower layer 614 which may be asthetically pleasing fabric such as vinyl or patent leather. This sandwich arrangement 616 comprising conductor 610 contained inbetween material 612 and 614 may be sewn around the edges to hold the sandwich structure 616 together and in place and may further have metalic snaps 620–623 attached in place near the ends of the sandwiched collar 616. One well known snap arrangement is provided by GL Company to Ole's Hardware Store labeled "SNAP FASTENER SET" stock number 209 and having sets of snaps 620-623 and a snap insertion tool for fixing snaps 620-623 in place. When snaps 620-623 are pressed into place with the tool, the snaps penetrate fabric 612 and 614 and foil 610 and make a good electrical contact with foil 610. Collar assembly 618, comprising sandwich structure 616 and snaps 620–623 may be bent in a semi-circular fashion so that snap pair 620 and 621 engages with snap pair 622 and 623 for snapping together in a semi-circular arrangement. It has been demonstrated that the electrical contact between the snaps 620–623 and metal foil 610 provides a good electrical contact and the electrical contact between snap pair 620 and 621 and snap pair 622 and 623 provides good electrical contact when snapped together, thereby providing a completely conductive circuit operating as a shorted turn of a transformer for affecting an electric field.

Other shorted turn arrangements may be provided for use with the system of the present invention. In one configuration, a ring through the nose of a bull or cow may be sensed in the same manner as the shorted turn collar arrangement described above. Other key arrangements will now become obvious to those skilled in the art from the teachings of the present invention.

In many applications, it is desirable not only to detect a key, but also to detect a particular key in a plurality of keys. For example, in the embodiment described above, it may be necessary to selectively feed a plurality of pets, where each pet may have its own food dispenser arrangement. Therefore, it is desireable to provide a plurality of keys that may be individually identified. An identifiable key 628 is shown in schematic form in FIG. 6B comprising a conductive loop 630 as discussed in detail above, but where conductive loop 630 must conduct through reactive network 632 to provide the shorted turn discussed above. Selection of capacitor C60 and inductor L60 in reactive network 632 defines a frequency at which network 632 is at resonance, where the resonant frequency of network 632 provides effectively a shorted turn for collar assembly 628. For frequencies different from the resonant frequency of network 632, collar assembly 628 will provide less disturbance for the electric field 329, where the system will have reduced sensitivity to that key. Therefore, a plurality of systems may be provided each having excitation generators with a different frequency unique to that system and having tuned keys 628-629 that are each responsive to a frequency of a related system. This embodiment will provide capability for identifying one of a plurality of different keys, wherein a related key may cause an output operation and wherein an unrelated key may not cause an output operation.

Multi-Element Key

Figure 6B:
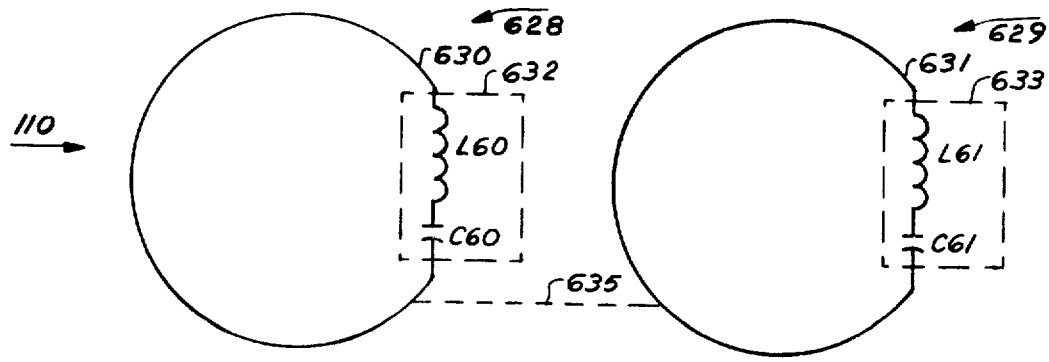

The present invention may provide selectivity between the presence or absence of a key device, as discussed with reference to FIG. 5, and may further provide detection of one of a plurality of key devices, as discussed with reference to FIG. 6B. Greater selectivity may be achieved using a key device having a plurality of individual key elements such as shown in FIG. 6B. For example, a key 110 may have a plurality of individual key elements 628–629 each having a resonant network 632–633, respectively, and each resonant network 632–633 being tuned to a different frequency. A plurality of excitation generators such as generator 500 and a corresponding plurality of sensors such as sensor 114 may be used to identify a multi-element key 110 to detect whether the key 110 contains tunable elements that are tuned to each frequency of the plurality of excitation generators. If a plurality of excitation generators and corresponding sensors each detect a key element tuned to a corresponding frequency, then access or other operations would be permitted. If one or more of the sensors does not detect a correspondingly tuned key element 628–629, then access would not be permitted. Therefore, the system of the present invention may be arranged, not only to detect the presence or absence of a key and not only to detect one key out of a plurality of keys, but may also be arranged to detect a combination of key elements in a key.

Key device 110 may have a plurality of individually identifiable key elements which may be two key elements 628 and 629 each having a loop 630 and 631 respectively and each having individually tunable resonant circuits 632 and 633 respectively including components L60, C60 and L61, C61 respectively. Dashed line 635 is intended to indicate that key elements 628 and 629 are merely exemplary of a general case where further key elements may be provided in addition to the two key elements 628 and 629 illustrated in FIG. 6B.

In one embodiment, each key element 628–629 may have an associated excitation generator 500 and sensor 114 providing a related frequency for detection of each of the plurality of key elements 628–629. It is herein intended that discussions relative to independent excitation generators 500 and sensors 114 be interpreted to include time shared use of excitation generator 500 and sensor 114 such as by switching components or tuning circuits as discussed hereinafter.

In one embodiment, a combination of key elements may be identified simultaneously by providing a plurality of excitation generators and sensors operating simultaneously, wherein the output device 122 would be actuated by the parallel combination of a plurality of processor signals 120. In another embodiment, a sequential selection of a plurality of frequencies may be provided to sequentially interrogate a key 110 with a sequence of excitation frequencies from excitation generator 500 and detected with sensor 114; wherein output device 122 would detect a sequence of processed signals 120 to provide the desired selective operation of output device 122.

Sequential interrogation of a plurality of key elements 628–629 has been found to provide special advantages, where much of the circuitry shown in FIG. 5B may be shared between a plurality of frequencies, where each frequency may be selected merely by switching frequency related components in excitation generator 500 and sensor 114. For example, a plurality of frequencies may be provided by switching excitation generator capacitor C1 and sensor capacitors C4 and CV to change the frequency generated with resonant circuit 512 and to correspondingly change the frequency detected with resonant circuit 516 to detect the presence of a key element having a correspondingly tuned resonant circuit.

The above described embodiment having a combination key arrangement may be used in a manner similar to mechanical key and lock devices that are well known in the art. Such prior art devices have (1) a plurality of tumblers to detect a plurality of mechanical indentations in a well known key or (2) a plurality of sequential positions in a well known combination lock arrangement. Detection of the parallel combination of the identations in a mechanical key or the sequential combination of a plurality of rotational positions in a mechanical combination lock provides access in response thereto. The electronic lock and key arrangements of the present invention may be used in a similar manner to these prior art arrangements but with the unique advantages of electronic devices compared to mechanical devices.

Alternate Embodiments

The present invention has broad scope and covers many alternate embodiments, a few of which are described below.

In one alternate embodiment, a key 110 may modify the electrical characteristics of a generated signal, wherein the altered characteristics may be detectable to identify the presence of key 110. For example, key 110 may contain a diode such as in network 632, where the diode operates in the form of a well known crystal radio receiver to rectify or detect the generated signal 329. A detected signal has many frequency components due to the non-sinusoidal waveform, where the new frequency components associated with the detected signal may be sensed with a well known rerceiver in the electronic subsystem 210 to identify the presence of key 110. In this embodiment, an excitation generator 500, sensor 114, signal processor 118, and output device 122 might be similar to that shown in FIGS. 5A and 5B, but where key 110 would contain a crystal detector and where sensor 114 would be tuned to sense a frequency component of detected signal that is different from the signal frequency generated by excitation generator 500. Further, sensor 114 may use well known active receiver devices such as with RF amplifiers and IF amplifiers to provide improved sensitivity and selectivity.

In another embodiment, key 110 may be an active device transmitting energy to a receiver included in sensor 114 to detect key 110. Key 110 may be implemented as a radio transmiter, as a laser or light emitting diode (LED), as a sonic device such as a microphone or other acoustic transducer, as a heater element for generating thermal energy, or other well known energy transmitters. Sensor 114 may be any well known receiver of the transmitted energy such as a well known radio receiver for radio signals, photo-detectors such as a photocell for illumination signals sonic transducer such as a microphone for sonic signals, temperature transducer for thermal signals, or other well known receiver devices.

In yet another embodiment, sensor 114 may be an active transmitter and key 110 may be a receiver to detect position therebetween, where transmitter and receiver embodiments are discussed above.

In still another embodiment, sensor 114 may be a magnetic field sensor such as used in well known fluxgate compass or magnetometer devices, where sensor 114 would detect a magnetic field or a disturbance in the earth's magnetic field due to the presence of key 110. In this embodiment, key 110 may be a magnet such as a well known permanent magnet generating a magnetic field or may be a low reluctance material such as soft iron to disturb an externally generated magnetic field such as the earth's magnetic field.

An alternate embodiment for identifying a particular key may utilize well known coding techniques such as pulse coding, frequency coding, amplitude coding, or other well known coding techniques. In one embodiment, such coding may be used to modulate a transmitted signal and may be decoded and identified in a receiver as discussed above and as is well known in the art.

In yet another embodiment, the system of the present invention may be used to teach an animal, which will be exemplified hereinafter with embodiments to teach a dog not to bark and to teach a dog not to jump a fence. In these embodiments, the system 102 may be mounted directly on the dog such as in collar arrangement or saddle type arrangement.

In a bark silencer embodiment, sensor 114 may detect a bark such as with a well known microphone arrangement where signal processor 118 generates output signal 120 in response to sensor signal 116. Output device may be a shock circuit, as described with reference to FIG. 5B, or other output device. When the dog barks, the microphone sensor 114 generates souond related signals 116 to signal processor 118, which identifies the bark and generates output signal 120 in response thereto. Output device 122 generates a shock signal in response to the bark related output signal 120 to teach the dog not to bark.

In an alternate embodiment of the bark silencer system described above, signal processor 118 may amplify bark signal 116 to generate an amplified bark signal 120 to an audio transducer such as a well known speaker or an earphone to provide a bark echo having sufficient amplitude to be disturbing to the dog for discouraging barking.

In a fence jumping embodiment, key 110 may be a wire having excitation and being placed at the top of a fence for generating an electric field in the proximity thereof. Sensor 114 senses the electric field when the dog comes into the proximity of the top of the fence thereby generating sensor signal 116. Signal processor 118 processes and identifies sensor signal 116 for generating output signal 120 in response to identification of proximity with the key 110. As discussed above output device 122 may be a shock device generating a shock signal to a dog in response to the fence-top related output signal 120.

In yet another embodiment, an electronic lock and key system may be provided, where the identifying device may be characterized as a key and the sensor, signal processor and actuator arrangement may be termed an electronic lock. The system may provide access for a person having a proper key and may preclude access for a person having an improper key or having no key at all. The access and control of people may be provided in the same manner as described above for the access and control of animals.

In still a further embodiment, control of vehicles may be provided wherein vehicles having the proper identifying device or key may be permitted access while vehicles not having the appropriate identifying device may be excluded.

In yet another embodiment, a proximity control arrangement may be provided to teach an animal to remain in the proximity of or out of the proximity of a key device. For example, mounting of system 102 on a collar or saddle for a dog and mounting a key device on a trainer would permit the dog to receive a shock whenever he left the proximity of the trainer such as for training a dog to heal.

In a still further embodiment, sensor 114 may be accelerometer to sense acceleration as a key. Such an arrangement would permit an animal to receive a shock whenever acceleration of a certain magnitude is detected. This arrangement may be responsive to running motion to train an animal not to run or, conversely, not to stop running or may be responsive to physical shock to teach a horse not to buck, or other such arrangements.

In yet another embodiment stock animals may be controlled. Stock animals may be permitted to have access to open rangeland, where stock of many ranchers may become mixed. If a particular rancher supplied salt, grain, water, or other consumables, all stock may be permitted to use these consumables. With the use of the present invention, the consumables may be selectively provided to the stock of a particular rancher and may be selectively withheld from the stock of other ranchers and from wild animals.

In a still further embodiment, animals controlled with the system of the present invention may be conditioned against attempting to obtain access, where a cat who receives a shock while attempting to feed, as shown in FIG. 2, may be permanently conditioned against attempting to feed from that particular food source. Therefore, system 102 may be useable, not only to temporarily control an animal, but to virtually permanently control an animal by providing conditioning signals thereto. Conditioning of animals is well known in the art such as taught by Pavlov with well known dog experiments.

Scope

The scope of the present invention is intended to be broad and to encompass improvements in the areas of control of animals identification of animals, identification of humans, identification of objects, detection arrangements, and improved circuitry arrangements.

A preferred embodiment has been described for a cat feeder arrangement wherein a cat wearing a particular collar is permitted to feed, but where a cat not wearing such a collar receives a shock to discourage feeding. This preferred embodiment is merely exemplary of the teachings of the present invention and is intended to cover a broad range of alternate embodiments, some of which are discussed hereinafter.

The cat feeder is exemplary of other feeder arrangements, where in the teachings of this invention may be used to control eating and drinking by animals and wherein these animals may be pets such as cats and dogs; domesticated animals such as horses, cows, pigs, etc; free-roaming animals such as range cattle; wild animals such as deer and bear; and other animals.

A preferred embodiment has been described for controlling access to food, which is merely exemplary of the broader scope of this invention which may be used to control access to food and drink for animals, "salt licks" for cattle, and other such consumables. It is herein intended that any reference to a particular consumable such as food includes all types of consumables such as food, drink, vitamins, medicine, etc.

A preferred embodiment has been described for permitting a cat to have access to food on a selective basis. It is herein intended that any reference to selectively accessing of food by a cat include selective accessing of buildings or other structures, yards and other outdoor areas, selective dispensing of consumables or other items, and other selective control.

Terminology has been adapted that examplifies the features of the preferred embodiment and encompasses the broad scope of the present invention, as discussed below.

The term "access" is herein intended to mean "the giving of the right to come into, approach, or use" (Websters' New World Dictionary) and is intended to include the accessing of items such as food and drink and is further intended to include gaining admittance to an area such as a structure, a pasture, or other such area.

An identification device and terms pertaining thereto is herein intended to mean one which distinguishes from others wherein it may be related to distinction of one device out of a plurality of devices or it may mean distinction between the presence of a device and the absence of a device.

The terms shorted turn, loop, etc. are herein intended to mean a conductive device that encloses an area that is greater than the area of the conductive device, such as with a toroidal conductor, and wherein the area of the conductive material, such as limited to the outer perifery, is less than the total area enclosed by the device, such as for enclosing electric "field lines".

The term "selectivity" and terms pertaining thereto are intended to mean the ability to distinguish between devices or between the presence and absence of such devices.

A "passive" key device is intended to mean a key device that does not require self contained excitation or energy, where electronic devices typically require self contained excitation or energy such as from a battery or power supply.

Considerations

The invention disclosed herein is presented in a preferred embodiment to examplify the inventive features, but the scope of this invention is much broader than illustrated with preferred embodiment. Therefore, the scope is intended to be broadly interpreted to cover the general fields of selective control, access control, and locks and keys.

Various publications may be used for providing background for this invention and for illustrating the prior art. The various subject areas and associated references for each subject area are listed below.

1. Hurley, Richard B.; JUNCTION TRANSISTOR ELECTRONICS: John Wiley and Sons, Inc. (1958) and 2. Fitchen, Franklin C.; TRANSISTOR CIRCUIT ANALYSIS AND DESIGN; D. Van Nostrand Co. Inc. (1960) and 3. Ramo and Whinnery; FIELDS AND WAVES IN MODERN RADIO; John Wiley and Sons, Inc. (1956)

These publications and the publications referenced therein provide non-essential subject matter and are incorporated herein by reference.

Various elements of the present invention have been described separately herein for simplicity. In a preferred embodiment, various elements of the present invention may be used in combination to provide the combined advantages of the individual elements. These combinations will become obvious to those skilled in the art from the teachings of this invention.

From the above description it will be apparent that there is thus provided a device of the character described possessing the particular features of advantage before enumerated as desireable, but which obviously is susceptible to modification in its form, method, mechanization, operation, detailed construction and arrangement of parts without departing from the principles involved or sacrificing any of its advantages.

While in order to comply with the statute, the invention has been described in language more or less specific as to structural features, it is to be understood that the invention is not limited to the specific features shown, but that the means, method, and construction herein disclosed comprise the preferred form of several modes of putting the invention into effect, and the invention is, therefore, claimed in any of its forms or modifications within the legitimate and valid scope of the appended claims.

What is claimed is:

1. A system for selectively controlling access of an animal, said system comprising:
   identification means for identifying a selected animal;
   detecting means for generating an identification signal in response to the identification means;
   means for controlling access in response to the identification signal, said controlling means including means for generating an electric shock in response to the identification signal.

2. The system as set forth in claim 1 above wherein said system is an animal feeding system; wherein said system further comprises means for containing food; wherein said identification means includes a collar; wherein said collar includes means for attaching to an animal and means for detection with said detecting means; and wherein said controlling means includes means for controlling access to food in said containing means in response to detection of said collar.

3. An access control system comprising:
   excitation means for generating an electric field, said excitation means including oscillator means for generating an oscillator signal and means for providing the field in response to the oscillator signal;
   key means for modifying the electric field, wherein the modication of the electric field is related to the position of said key means;
   sensor means for generating a sensor signal in response to the electric field, wherein said sensor signal is related to the position of said key means;
   signal processing means for generating an output signal in response to the sensor signal; and output means for generating an output operation in response to the outpput signal, wherein said output operation is related to the position of said key means.

4. The system as set forth in claim 3 above wherein said key means includes a conductive loop.

5. The conductive loop as set forth in claim 4 above including means for providing conduction that is related to a frequency of the electric field and wherein the modification of the electric field is related to a frequency of the oscillator signal and is further related to a position of said key means.

6. The system as set forth in claim 3 above wherein said system is an animal control system and wherein said key means includes a conductive loop arranged as an animal collar.

7. The output means as set forth in claim 3 above including shock means for providing a shock signal in response to the output signal.

8. The system as set forth in claim 3 above wherein said field providing means includes an excitation coil, wherein said sensor means includes a sense coil, wherein said excitation coil is larger than said sense coil, and wherein said sense coil is mounted within a portion of the field that is internal to said excitation coil.

9. The system as set forth in claim 8 above further comprising containing means for containing a consumable, wherein said containing means is mounted at least partially within said sense coil.

10. The signal processing means as set forth in claim 3 above further comprising phase detector means for generating the output signal in response to a phase related condition of the sensor signal.

11. The output means as set forth in claim 3 above including means for containing a consumable and means for dispensing the consumable in response to the output signal.

12. An animal control system comprising:
oscillator means for generating an oscillator signal;
excitation coil means for generating an electric field in response to the oscillator signal;
identifying means for identifying an animal including means for attaching to an animal and including a closed conductive loop for modifying the electric field in response to a position of said identifying means;
sense coil means for generating a sense signal in response to the electric field, said sense signal being related to a position of said identifying means in the electric field, said sense coil means having a smaller dimension than said excitation coil means, and said sense coil means being mounted within the internal electric field of said excitation coil means;
processor means for generating an output signal in response to the sense signal; and
output means for controlling an animal in response to the output signal.

13. The system as set forth in claim 12 above wherein said output means includes shocker means for generating an electrical shock in response to the output signal.

14. The system as set forth in claim 12 above wherein the said closed conductive loop includes a shorted turn circuit for the modifying of the electric field.

15. An identification system comprising:
excitation means for generating an electric field;
a shorted turn circuit for modifying the electric field;
sensor means for sensing the modification of the electric field in response to the shorted turn circuit; and
identification means for generating an identification signal in response to the sensing of the modification of the electric field.

16. The system as set forth in claim 15 above wherein said shorted turn circuit includes means for mounting the shorted turn circuit as a collar for an animal.

17. The system as set forth in claim 15 above wherein said identification means includes a phase sensitive demodulator for generating the identification signal in response to a phase of the electric field.

18. An animal control system comprising:
excitation means for generating an electric field in response to an excitation signal;
oscillator means for generating the excitation signal;
a collar for mounting on an animal, said collar including an electric circuit loop being arranged around ssid collar for modifying the electric field;
detector means for generating a detector signal in response to the electric field; and
means for controlling an animal in response to the detector signal.

19. The system as set forth in claim 18 above wherein said electric circuit loop includes a shorted turn.

20. The system as set forth in claim 18 above wherein said detector means includes a phase sensitive demodulator for generating a phase related signal in response to a phase related characteristic of the electric field and further includes means for generating the detector signal in response to the phase related signal.

21. The system as set forth in claim 18 above wherein said controlling means includes shock means for generating an electric shock to control an animal in response to the detector signal.

22. The system as set forth in claim 18 above, wherein said system is a cat control system and wherein said system further comprises structural means for mounting said excitation means and said detector means in relation to the form of a cat.

23. A system for controlling an animal, said system comprising:
means for containing food;
oscillator means for generating an excitation signal;
an excitation coil for generating an electrical field in response to the excitation signal;
containing mounting means for mounting said containing means within said excitation coil;
means for identifying a selected animal;
means for generating an identification signal in response to said identifying means; and
means for controlling access to said containing means in response to the identification signal.

24. The identification signal generating means as set forth in claim 23 above including:
a sensor coil for generating a sensor signal in response to said identifying means and
sensor mounting means for mounting said sensor coil within said excitation coil.

25. The system as set forth in claim 24 above wherein said sensor coil is concentric about said containing means and wherein said excitation coil is concentric about said sensor coil.

* * * * *